July 11, 1933.  H. F. VICKERS  1,917,783
CONSTRUCTION FOR ROTARY TYPE CYLINDER AND PISTON MECHANISM
Filed May 19, 1930  2 Sheets-Sheet 1
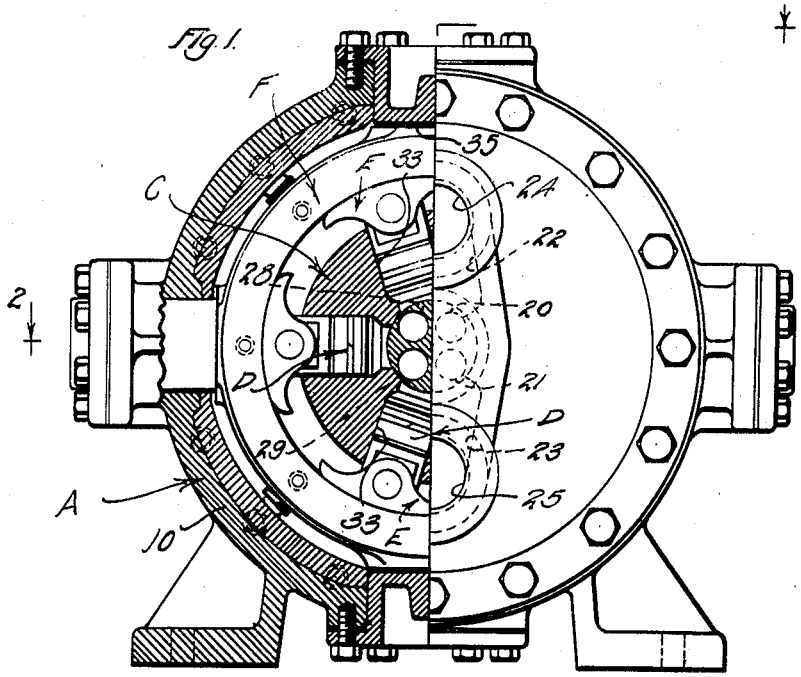
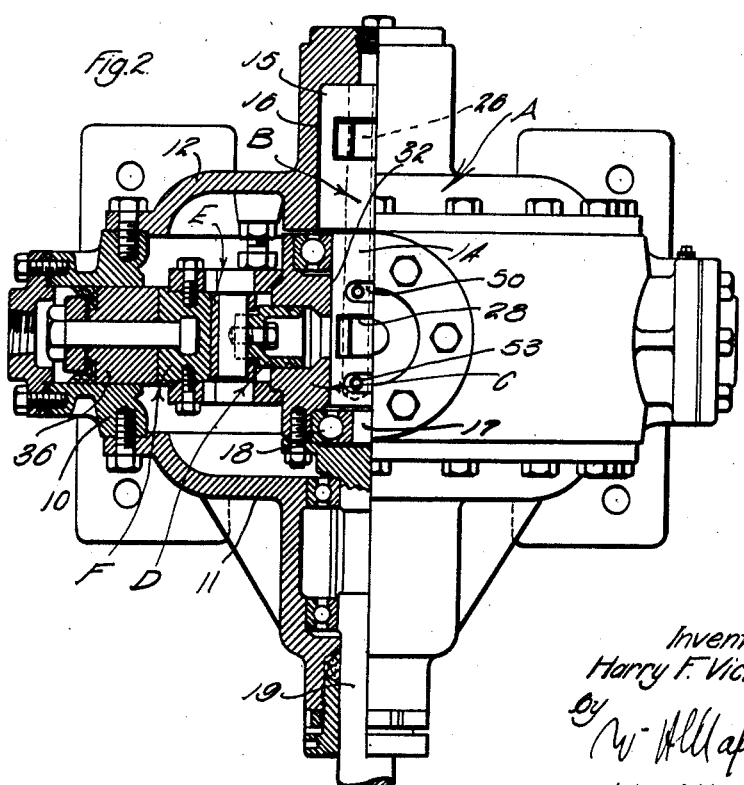
Inventor
Harry F. Vickers
by
his Attorney July 11, 1933.   H. F. VICKERS   1,917,783
CONSTRUCTION FOR ROTARY TYPE CYLINDER AND PISTON MECHANISM
Filed May 19, 1930   2 Sheets-Sheet 2
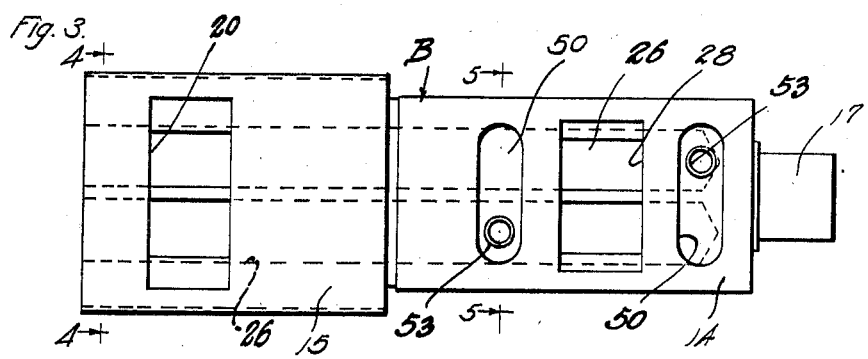
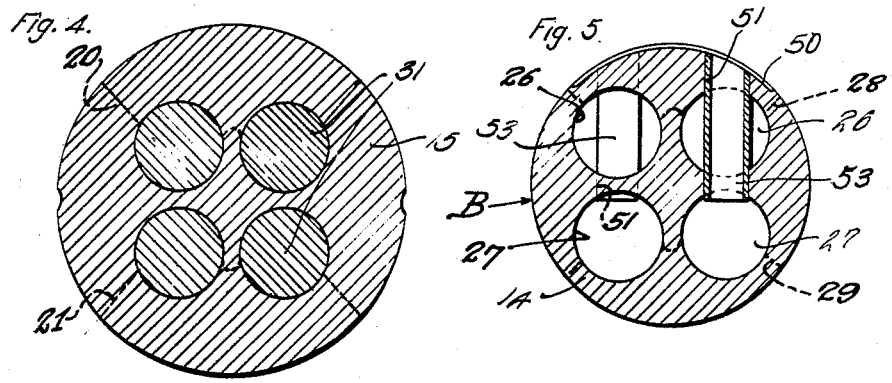
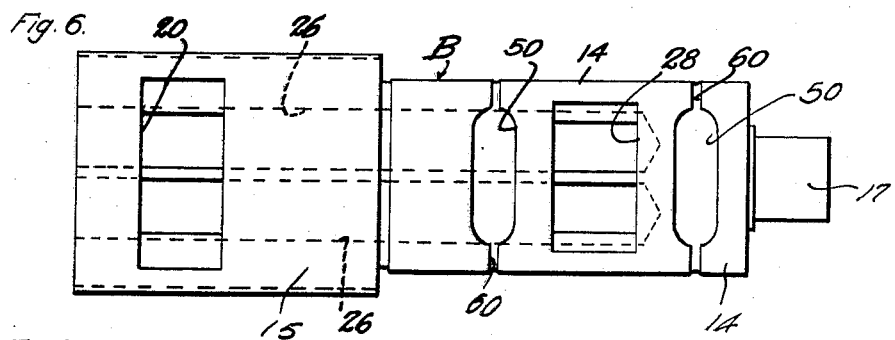
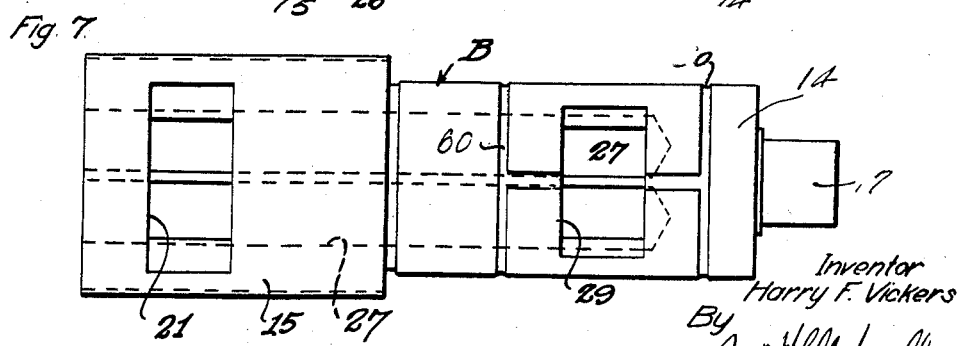
Inventor
Harry F. Vickers
By
His Attorney Patented July 11, 1933

1,917,783

UNITED STATES PATENT OFFICE

HARRY F. VICKERS, OF LOS ANGELES, CALIFORNIA

CONSTRUCTION FOR ROTARY TYPE CYLINDER AND PISTON MECHANISM

Application filed May 19, 1930. Serial No. 453,850.

This invention relates to a construction for use in the rotary type of cylinder and piston mechanism, it being a general object of the invention to provide a construction for effectively balancing pressures in such a mechanism.

The rotary type of cylinder and piston mechanism is employed in various machines, for instance, in pumps, compressors, engines, fluid motors, etc. This type of mechanism involves, generally, a rotating cylinder block, pistons carried in the cylinders of the block, shoes on the outer ends of the pistons cooperating with an eccentric ring, and a hub either projecting from or extending into the cylinder block, the block having cooperating ports to control the flow of fluid to and from the cylinders. In practice it has been found that this general type of mechanism has been limited due to the unequal distribution of pressures which causes excessive pressure on the bearing parts, particularly between the hub and the part moving relative to it.

It is a general object of this invention to provide a mechanism of the general character mentioned in which the pressures are equalized so that free rotation occurs between the hub and the part moving relative to it regardless of the speed of the mechanism and the pressures under which the mechanism operates.

A further object of the invention is to provide a mechanism of the character mentioned in which the cylinder block turns on or around the hub and in which means is provided for balancing the pressures between the hub and the cylinder block.

The various objects and features of the present invention will be best and more fully understood from the following detailed description of typical preferred forms and applications of the invention, throughout which description reference is had to the accompanying drawings, in which:

Fig. 1 is an end view of a mechanism embodying the invention showing the parts to one side of a vertical center line in section and those at the other side of the line in elevation. Fig. 2 is a plan view taken as indicated by line 2—2 on Fig. 1 showing the parts at one side of a longitudinal center line in section and those at the other side of the center line in elevation. Fig. 3 is an enlarged detailed view of the hub of the mechanism showing it removed from the other parts of the machine and showing the low pressure ports and balancing recesses in the hub. Fig. 4 is an enlarged detailed sectional view taken as indicated by line 4—4 on Fig. 3. Fig. 5 is an enlarged detailed sectional view taken as indicated by line 5—5 on Fig. 3, being a view showing the manner in which the high pressure ports are connected with the balancing recesses at the low pressure side of the hub. Fig. 6 is a view similar to Fig. 3 showing a somewhat different form of construction, and Fig. 7 is a view similar to Fig. 6 showing the opposite side of the hub illustrated in Fig. 6.

The present invention is concerned primarily with the balancing or equalization of pressures in a rotary type of cylinder and piston mechanism. The invention may be carried out in various constructions and may be employed to advantage in mechanisms operating in various manners; for instance, as compressors, pumps, motors, engines, etc. For the purpose of facilitating an understanding of the invention I will describe it as applied to a rotary type cylinder and piston mechanism in which the cylinder block revolves about a stationary hub, which mechanism is designed primarily for use as a pump or compressor. It is to be understood, of course, that the details herein set forth are not to be construed as limiting or restricting the broader principles of the invention.

The mechanism illustrated in the drawings includes, generally, a casing A, a hub B in the casing, a cylinder block C arranged in the casing to revolve about the hub, a plurality of pistons D operating in the cylinders of the block C, shoes E on the outer ends of the pistons to operate in an eccentric ring F within the housing, and various other parts incidental to those mentioned.

The casing A has a cylindrical center section 10 and end plates 11 and 12 closing the ends of the center section.

The hub B is mounted centrally in the casing A and in the particular form of mechanism illustrated is stationary relative to the casing. The hub B has a middle portion 14 within the casing and on which the cylinder block C rotates. Adjoining one end of the middle part 14 is an enlarged end part 15 which is supported in a socket 16 provided in the end plate 12 of the casing. Adjoining the other end of the middle part 14 is a reduced end part 17 supported by a bearing 18 carried by a shaft 19 which extends into the casing through the end plate 11. The enlarged end part 15 is fixed in the socket 16 so that it is stationary relative to the casing and has diametrically opposite ports 20 and 21 communicating with low pressure and high pressure ports 22 and 23, respectively, in the end plate 12 of the casing. The ports 22 and 23 terminate in openings 24 and 25, respectively, adapted to be connected with suitable conduits for conducting fluid handled by the mechanism. The ports 20 and 21 communicate with passages 26 and 27, respectively, which extend longitudinally through the hub to the middle part 14. At the middle part 14 of the hub the passages 26 and 27 communicate with diametrically opposite ports 28 and 29, respectively, the mechanism being operated as a compressor. The port 28 is an inlet port operating to admit fluid into the cylinders of the block C, while the port 29 is an outlet port through which fluid is forced from the cylinders. In the particular construction illustrated there are two passages 26 and two passages 27 in the hub, the passages being in the form of bores made in the hub through the large end 15. The outer ends of the bores may be closed by plugs 31, or the like.

The cylinder block C is arranged in the casing A and has a central bore 32 fitting the middle part 14 of the hub. A plurality of cylinders 33 are formed radially in the block C to carry the pistons D. The pistons D project outwardly from the block C and carry the shoes E which operate in the eccentric ring F. In the particular case illustrated the eccentric ring F is mounted in the casing A through slides 35 so that it can be shifted through the cylinder and piston device 36 to vary its eccentricity relative to the casing. By varying the eccentricity of the ring the stroke of the piston D is varied.

The cylinder block C is attached to the shaft 19, and in the case illustrated a bearing 37 is provided between the hub and block at one end of the block, preferably at the end adjacent the end plate 12 of the casing A.

In accordance with the present invention the middle part 14 of the hub is provided at the side where the low pressure port 28 is located, or, in other words, in the vicinity of the low pressure port, with one or more recesses 50. In Fig. 3 of the drawings I have illustrated a preferred arrangement of the recesses 50 in which case there is a recess in the part 14 in either direction longitudinally from the low pressure port 28. In accordance with the invention the recesses 50 are connected with the high pressure port at the opposite side of the hub part 14 so that pressure is communicated from the high pressure side of the hub to the low pressure side. Various means may be provided for communicating pressure between the two sides of the hub, or, in other words, between the high pressure port and the recesses 50. In the form of the invention illustrated in Figs. 3 and 5 openings 51 are formed transversely through the hub from the passageways 27 to the recesses 50. In the particular arrangement of parts illustrated the openings 51 intersect the low pressure passages 26 and therefore tubes 53 are set in the openings 51 to communicate fluid or pressure from the high pressure passages 27 to the recesses 50 without allowing escape into the low pressure passages 26. In practice there may be a single opening 51 or tube 53 connected with each recess 50. The combined areas of the recesses 50 are related to the areas of the low pressure and high pressure ports 28 and 29 so that when the machine is in operation the pressures between the hub and cylinder block are equal at the low pressure and high pressure sides of the hub. In this way the bearing engagement between the hub part operating relative to it, in this case the cylinder block, is equalized so that the parts operate freely relative to each other when the machine is in full operation.

In Figs. 6 and 7 of the drawings I illustrate a form of hub construction varying slightly from that just described. In this form of the invention the means for communicating pressure from the high pressure port passageways to the recess 50, instead of involving openings 51 or tubes 53, involve grooves or channels 60 formed in the exterior of the hub to extend from the high pressure port around the hub, preferably in both directions, to join the recesses 50 as will be clearly apparent from examination of Figs. 6 and 7.

Having described only typical preferred forms of my invention, I do not wish to limit myself to the specific details set forth, but wish to reserve to myself any changes or variations that may appear to those skilled in the art or fall within the scope of the following claims.

Having described my invention, I claim:

1. A hub for a mechanism of the character described having longitudinal high and low pressure ports opening at the surface of the hub at circumferentially spaced points, recesses spaced in opposite directions longitudinally of the hub from the opening of the low pressure port, and means for communicating pressure from the high pressure port to the recesses including tubes extending through openings in the hub intersecting the low pressure port and connecting the high pressure ports and the recesses.

2. A hub for a mechanism of the character described having longitudinal high and low pressure ports opening at the surface of the hub at circumferentially spaced points, recesses diametrically opposite the high pressure port and spaced in opposite directions longitudinally of the hub from the opening of the low pressure port, and means for communicating pressure from the high pressure port to the recesses including tubes extending through openings in the hub intersecting the low pressure port and connecting the high pressure ports and the recesses.

3. A hub for a mechanism of the character described having high and low pressure ports extending longitudinally through it and opening at the surface of the hub at diametrically opposite sides of the hub, a recess in the surface of the hub diametrically opposite the opening of the high pressure port, and a passage connecting the high pressure port and the recess and intersecting the low pressure port, and a tube in the passage to pass fluid pressure from the high pressure port to the recess.

In witness that I claim the foregoing I have hereunto subscribed my name this 24th day of March, 1930.

HARRY F. VICKERS.